United States Patent [19]

Montalbano

[11] Patent Number: 4,856,358
[45] Date of Patent: Aug. 15, 1989

[54] CONVERSION OF ROTATIONAL OUTPUT TO LINEAR FORCE

[76] Inventor: Paul J. Montalbano, 121 Sheraden Ave., Staten Island, N.Y. 10314

[21] Appl. No.: 133,879

[22] Filed: Dec. 16, 1987

Related U.S. Application Data

[63] Continuation-in-part of Ser. No. 519,005, Aug. 1, 1983, abandoned, and a continuation-in-part of Ser. No. 833,135, Jan. 13, 1986, abandoned.

[51] Int. Cl.[4] ............................................. F16H 33/20
[52] U.S. Cl. ........................................ 74/84 R; 74/61
[58] Field of Search ................. 74/25, 61, 84 R, 84 S, 74/87

[56] References Cited

U.S. PATENT DOCUMENTS

| | | | |
|---|---|---|---|
| 1,490,006 | 4/1924 | Goldschmidt | 74/61 X |
| 2,990,022 | 6/1961 | Muller et al. | 74/61 X |
| 3,258,979 | 7/1966 | Alsept | 74/25 X |
| 3,530,617 | 9/1970 | Halvorson et al. | 74/84 S X |
| 3,913,409 | 10/1975 | Opderbeck | 74/61 |
| 3,998,107 | 12/1976 | Cuff | 74/84 S |
| 4,073,195 | 2/1978 | Grosinger et al. | 74/25 |
| 4,078,439 | 3/1978 | Iturriaga-Notario | 74/25 X |
| 4,241,615 | 12/1980 | Ryan | 74/61 |
| 4,266,434 | 5/1981 | Burns | 74/87 X |
| 4,347,752 | 9/1982 | Dehen | 74/84 S |

*Primary Examiner*—Allan D. Herrmann

[57] ABSTRACT

A machine for converting rotary motion from a source of power to a linear force comprising three small gears in mesh with one large gear, a rocker element, an impeller (off-centered weight), and a cam shaft. The first small gear will be provided with a source of power which will drive the large gear which in turn will drive the other two small gears, the second small gear, housed in the rocker element, will be provided with an impeller which when rotated will provide a source of centrifugal force, the third small gear, designated cam gear, will be provided with a cam shaft which will control the operation of the cycle. A rocker element with two arms will pivot about the same center as the large gear. Mounted within one of the movable arms will be the second small gear with an impeller mounted on the interconnecting shaft. The second arm will be extended to the cam for the control of the cycle. The path traversed by the impeller will be that of a modified ellipse with the impeller always on the outside of the cycle. As the impeller travels this path the centrifugal force generated, due to the fluctuations of speed and curvature of trajectory, will vary. It is this variation which will provide the conversion of rotational output to linear force.

6 Claims, 7 Drawing Sheets

CONVERSION OF ROTATIONAL OUTPUT TO LINEAR FORCE

CROSS REFERENCES TO RELATED APPLICATIONS

This applications is a continuation-in-part of U.S. Pat. Applications Ser. Nos. 06/519,005 filed Aug. 1, 1983 now abandoned and 06/833,135 filed Jan. 13, 1986, now abandoned.

It is commonly known that weights can be used to balance wheels or more clearly stated to eliminate any vibrations which may occur in the wheel during rotation. Quite the opposite is found in most U.S. Patents rotating weights, rotating about a fixed or instant center, are used to induce a vibration. Typical of these devices are U.S. Pat. No 4,241,615 by Ryan, a vibrating device for ploughs, U.S. Pat. No. 3,913,409 by Opderbeck, a vibrating generator for ground tampering; U.S. Pat. No. 3,530,617 by Halvorson and Schwartz, a vibration vehicle; and U.S. Pat. No. 1,490,006 by Goldschmidt, a vibrating mechanical hammer.

Rotating weights are also used as a vehicle for obtaining a centrifugal force and that force is manipulated in order to get a desired result. Typical of this is U.S. Pat. No. 3,998,107 by Cuff, a device for converting rotary motion into a unidirectional linear motion.

The present invention relates to the category of manipulated centrifugal force and can be considered to be an improvement over the present state of the art in that it provides for the weight to rotate about a variable or instant center as well as to vary its speed for the purpose of maximizing the linear force output.

A weight when suspended in space tends to want to stay put. Any effort to move the weight about a circular path will be met with a force which will act opposite to the force of acceleration. We commonly term this force the Tangential Force. Once in motion about a circular path the weight possesses stored energy. This stored energy can be released as either centrifugal force or as a tangential force. It is the object of this invention to show how to utilize this energy by controlled release.

My invention is comprised of three basic elements. First, I increase and decrease the rotational speed through which the weight traverses. Here I am adding energy to the cycle through the drive mechanism.

Second, I control through a cam device the acceleration and velocity rates as well as the displacement angle for the rocker arm. Here I am controlling the amount of energy I put into the cycle.

Third, since the geometric shape of the curve path through which the weight traverses will be a modified ellipse, at any point on the curve the radius around which the weight rotates will change. To put it another way, by varying the shape of the curved trajectory, I am varying the instant center around which the weight rotates. By calculation it is found that the radius is smallest and the angular velocity the greatest in that part of the cycle which generates the greatest speed and that the radius is greatest and the angular velocity smallest in that part of the cycle with the lowest speed. Since the formula for centrifugal force is $F = Mass \times r \times \overline{w}^2$ where r is the radius and w is the angular velocity, it becomes apparent that the maximum force is generated at the side of the cycle with the highest speed. It is in this way that I release energy in a controlled manner so as to result in a linear force.

This invention relates to a machine for converting rotational output to linear force by the controlled release of energy to provide a source of power.

It is amongst the primary objects of this invention to devise a machine for converting rotational output to linear force, particularly as a source of vehicular power.

It is still another important object of the present invention to create linear force from rotational output as a power source to accomplish work of any nature.

It is yet another object of this invention to provide a simple and efficient reaction engine.

Still another major object of this invention is to provide a source of power which can be used as a tool in Robotics.

Other objects and advantages of the invention will become apparent from what is set forth in the following specification and accompanying drawings wherein.

Figure 6:
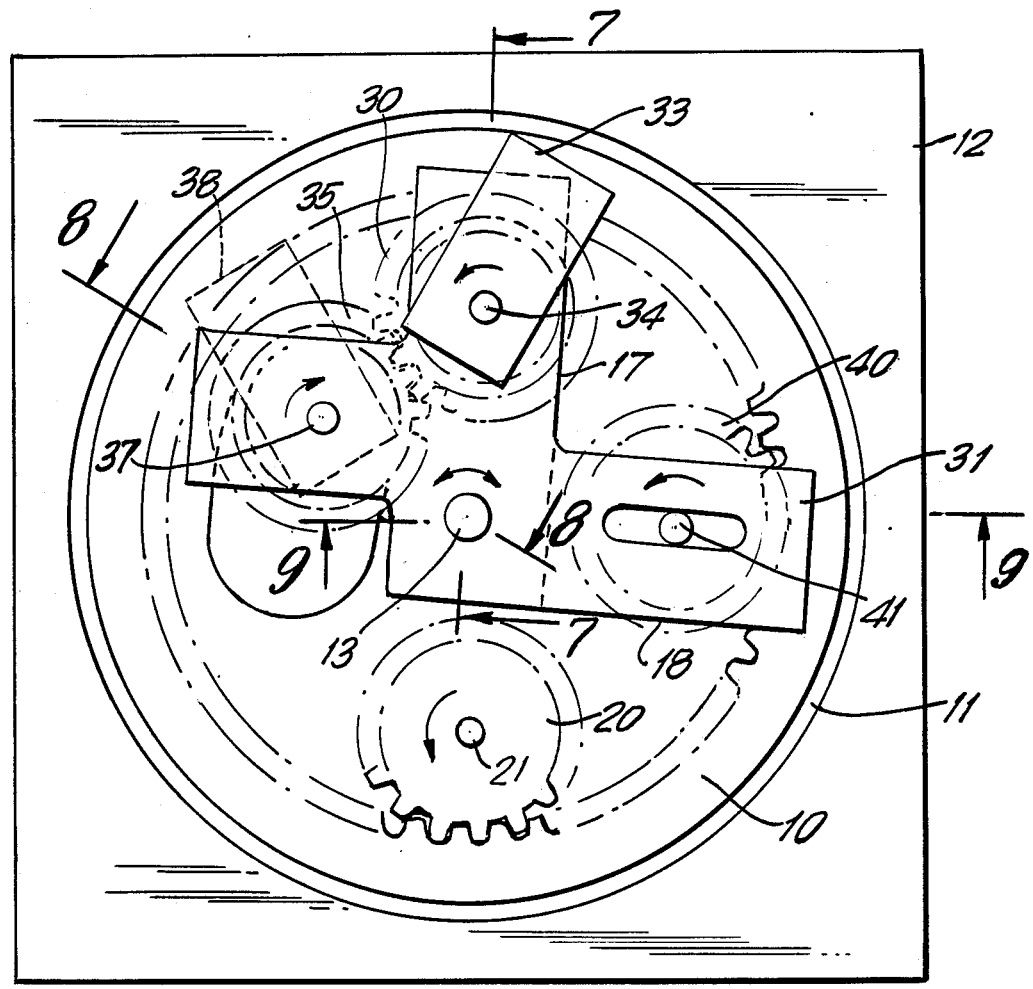
Figure 7:
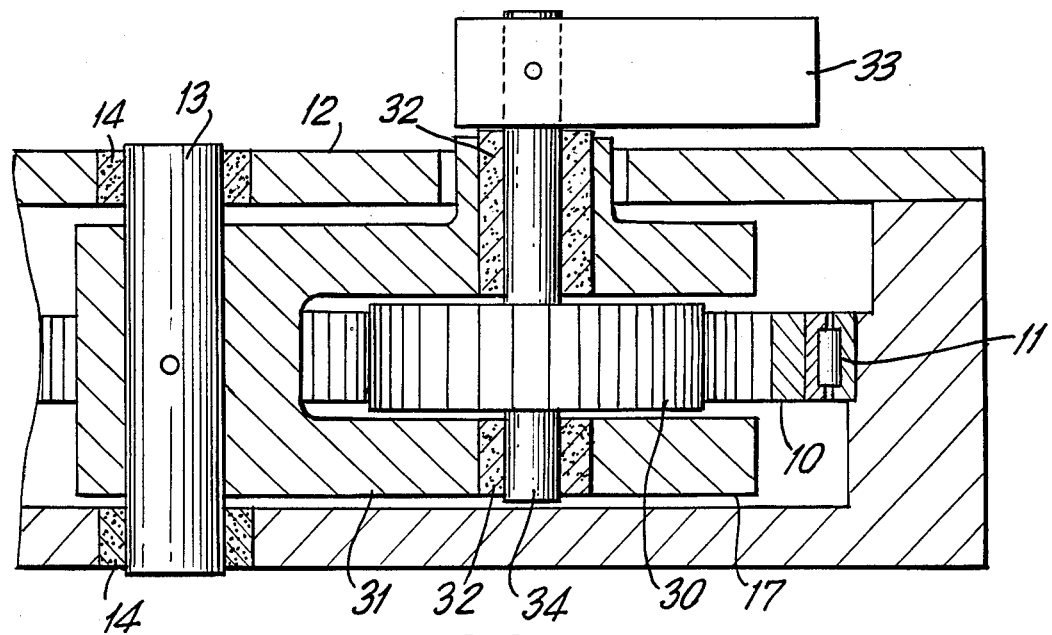
Figure 8:
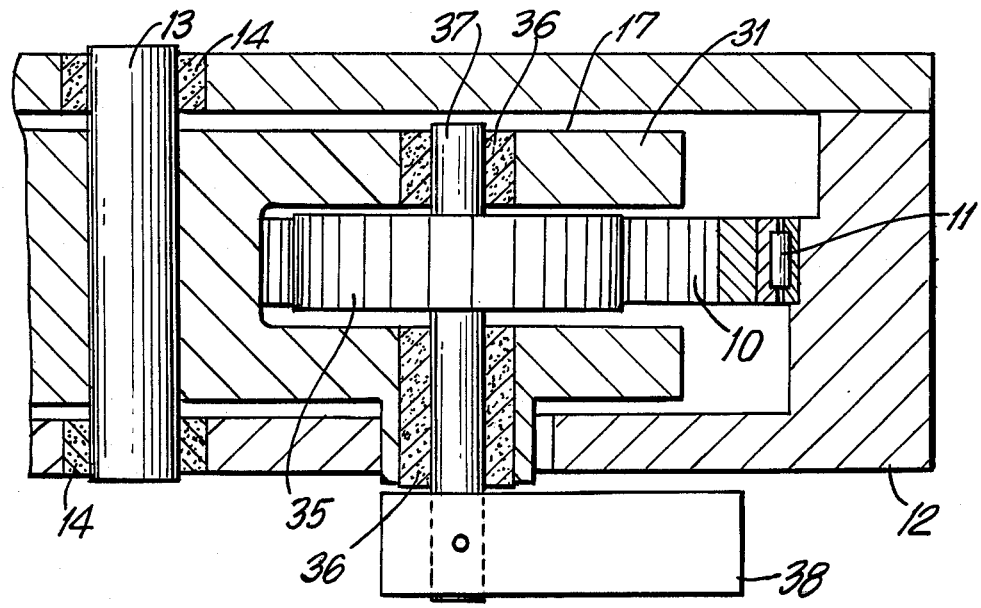
Figure 9:
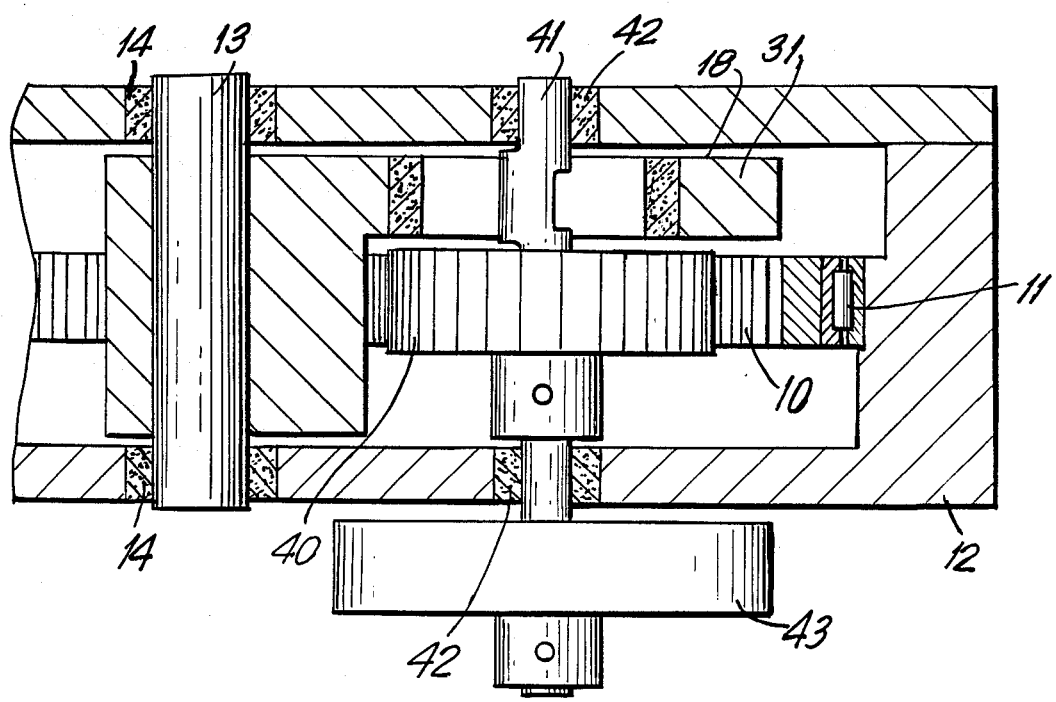
Figure 10:
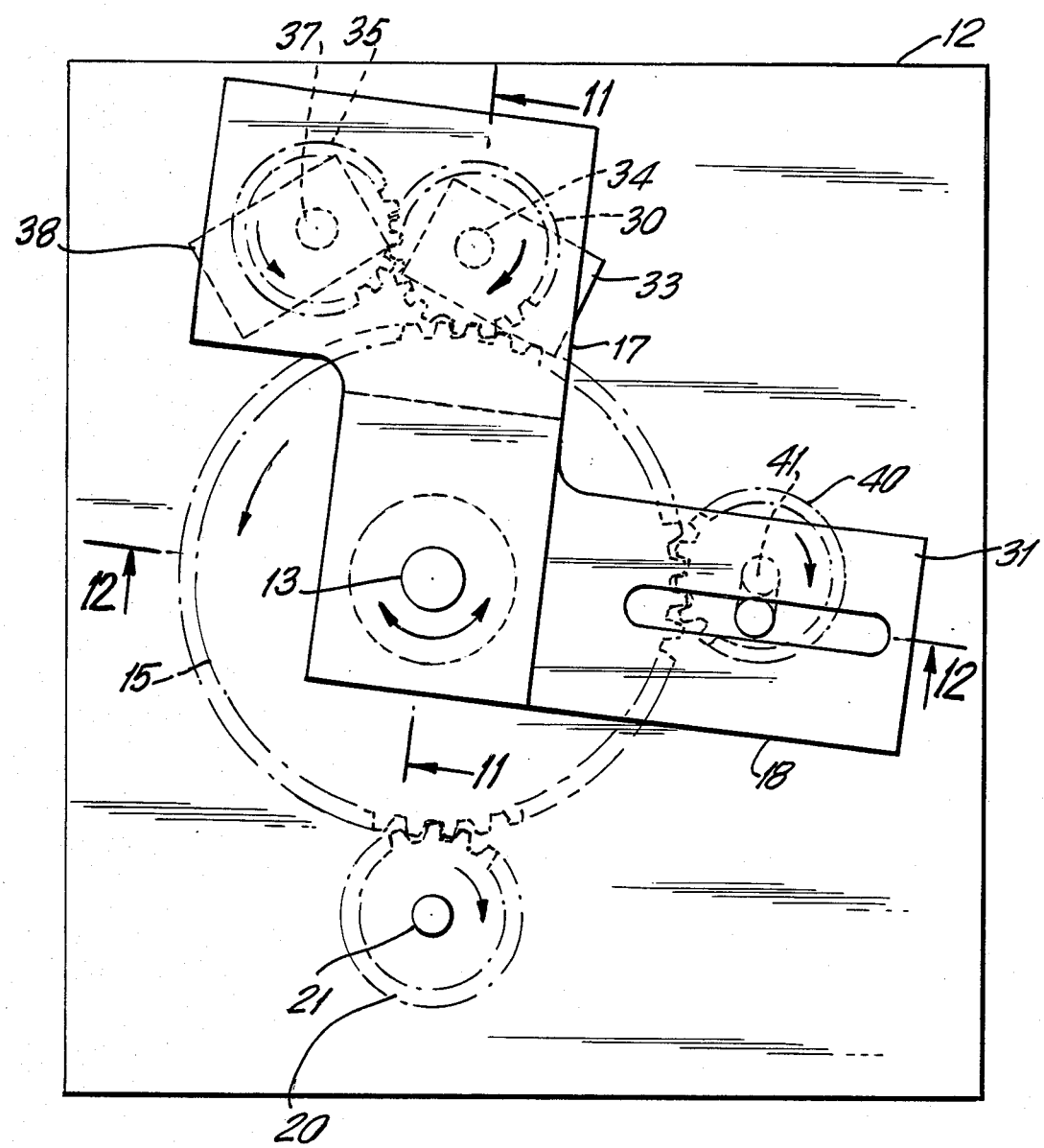
Figure 11:
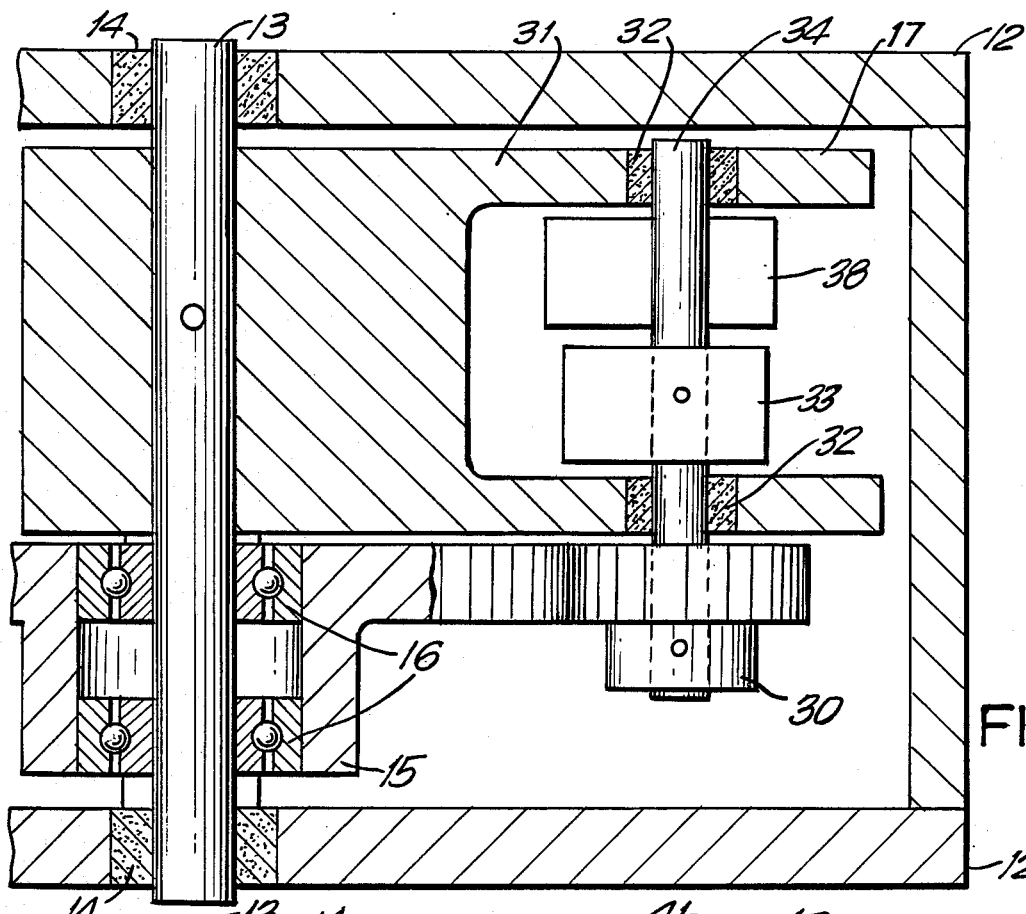
Figure 12:
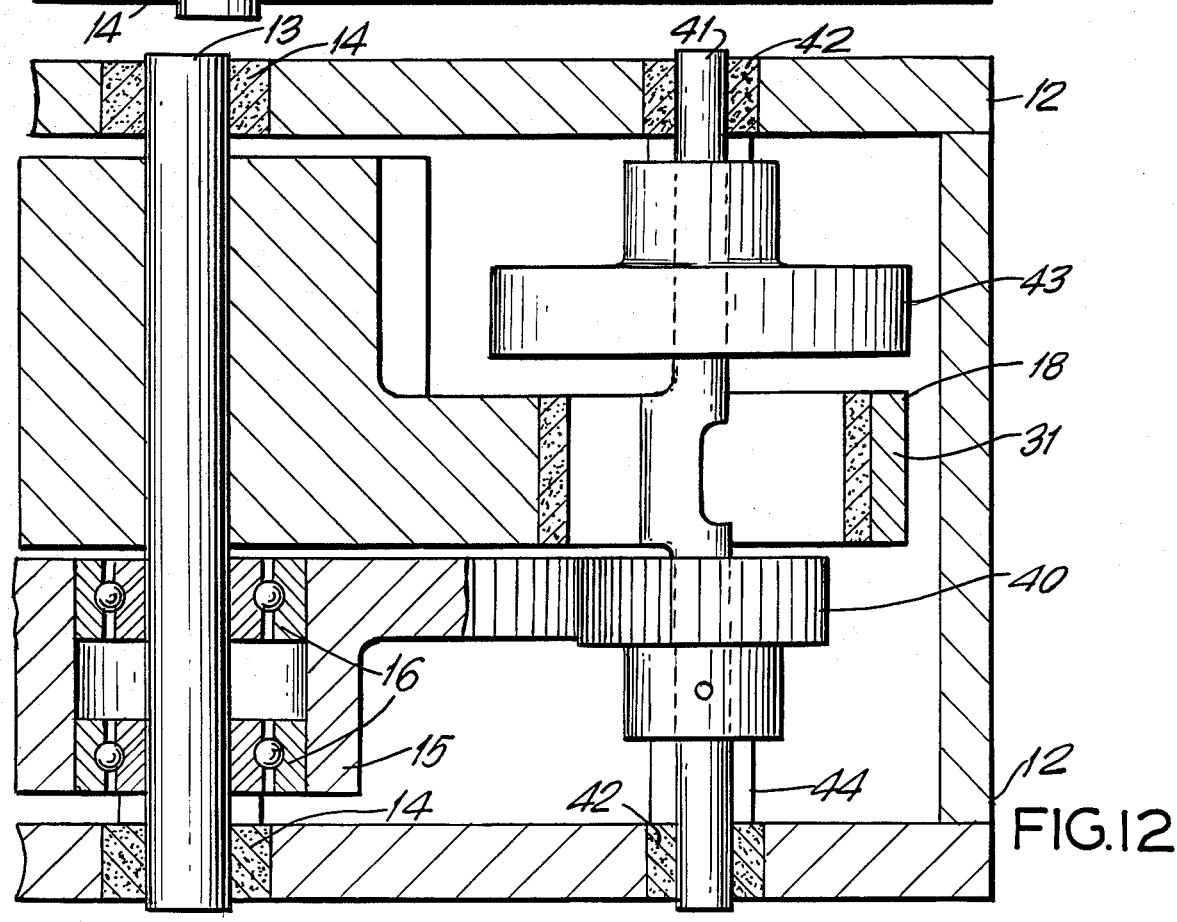

FIG. 5a through 5d schematically show various positions in the engine cycle;

FIG. 6 is another embodiment of the invention;

FIG. 7 is a sectional view taken on line 7—7 of FIG. 6;

FIG. 8 is a sectional view taken on line 8—8 of FIG. 6;

FIG. 9 is a sectional view taken on line 9—9 of FIG. 6;

FIG. 10 is yet another embodiment of the invention;

FIG. 11 is a sectional view taken on line 11—11 of FIG. 10;

FIG. 12 is a sectional view taken on line 12—12 of FIG. 10.

Figure 1:
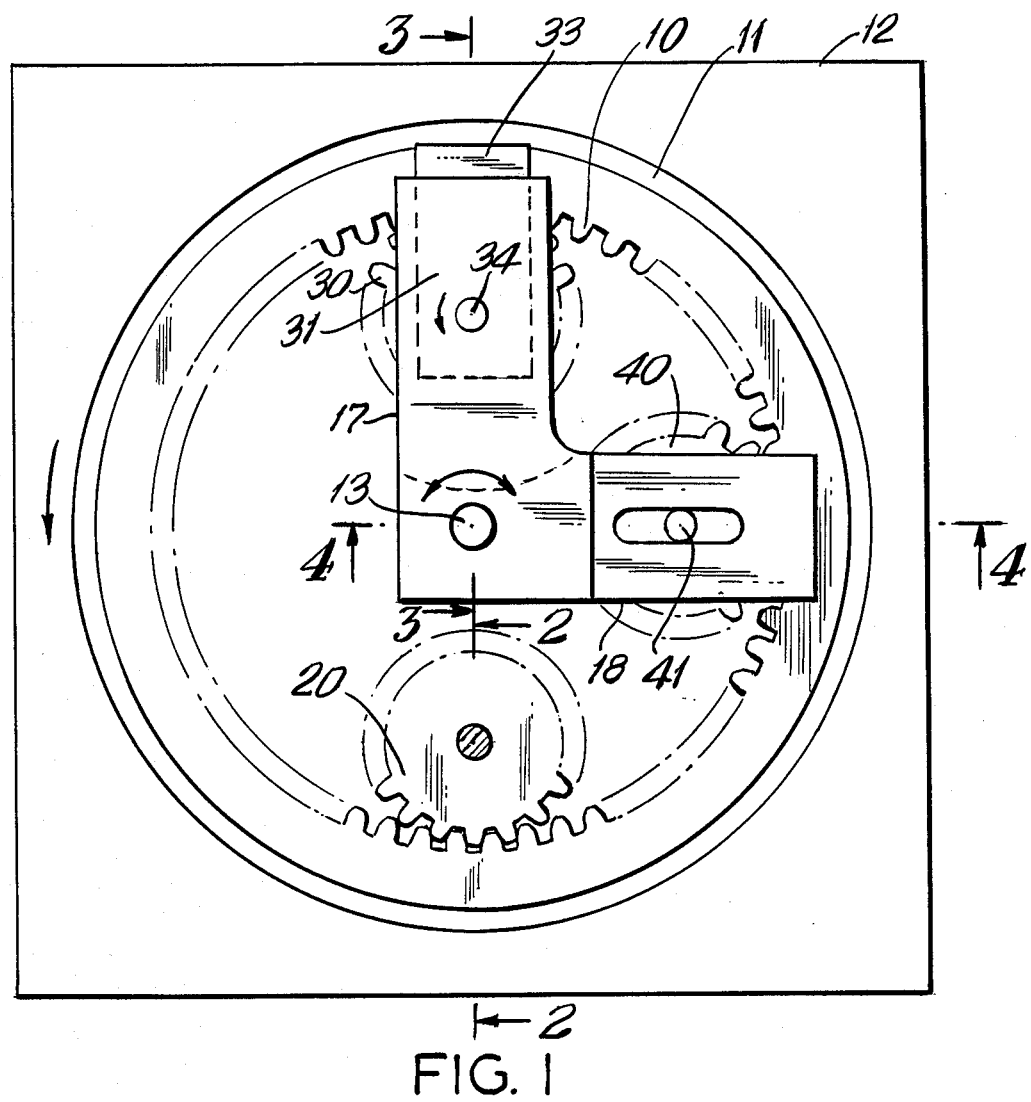
FIG. 1 is an elevational view of an embodiment of my machine (with one of the side plates removed)

In the embodiment of FIG. 1 the device is provided with spaced circular gears 20, 30 and 40 mounted in operative interconnection with a large internally toothed gear 10 which is supported on bearing 11. The three circular gears may be respectively characterized as the motor gear, the traveling gear and the cam gear. The assemblage is mounted with an engine compartment defined by casing 12. A rocker 31 is pivotally mounted on shaft 13 which extends along the axis of gear 10 and rocks about the shaft in sequential clockwise and counter clockwise direction as will be hereinafter amplified. Gear 10 is driven by motor gear 20 which is driven by motor 21.

Figure 3:
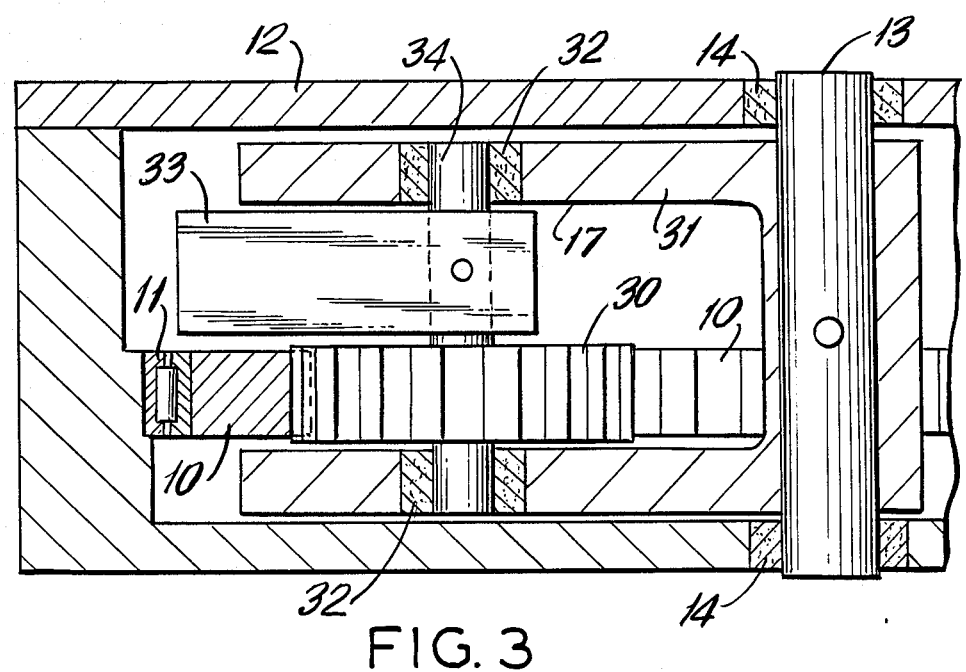
FIG. 3 is a sectional view taken on line 3—3 of FIG. 1.

Rocker 31 is provided with 2 arms. One arm 17, as shown in FIG. 3, is recessed to house impeller 33 and traveling gear 30 which are mounted on rotatably shaft 34. Shaft 34 extends across the recess and is supported by arm 17 via bushings 32. Gear 10 traverses the recess to engage traveling gear 30. Impeller 33 is mounted asymetrically on shaft 34 to create a source of centrifugal force.

Figure 4:
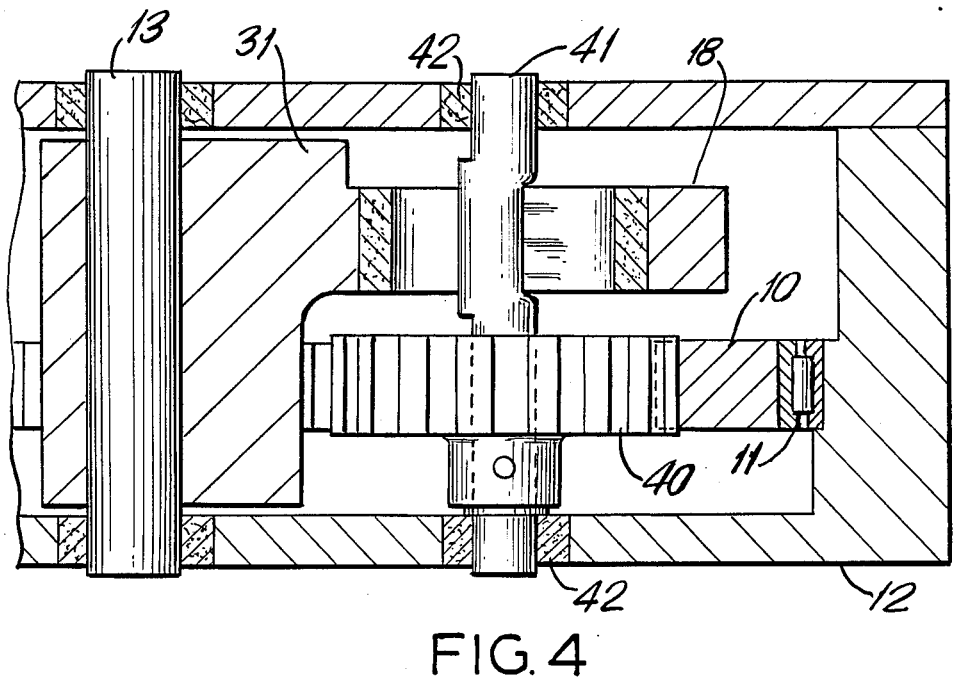
FIG. 4 is a sectional view taken on line 4—4 of FIG. 1.
Figure 5A:
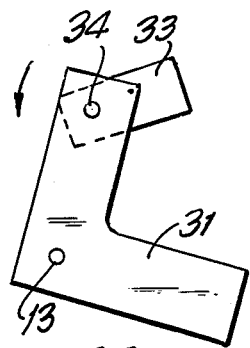
Figure 5B:
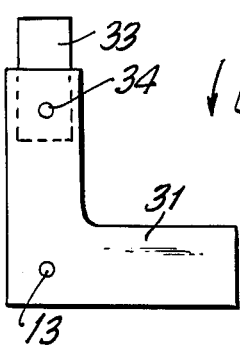
Figure 5C:
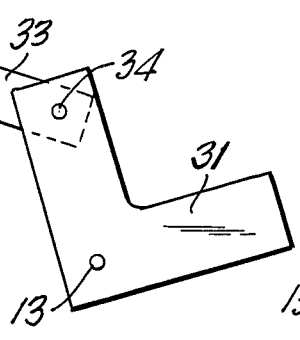
Figure 5D:
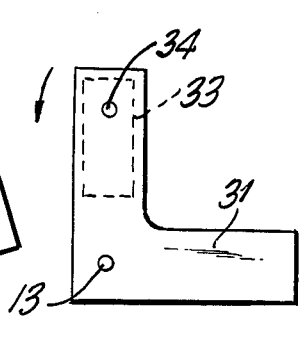

In FIG. 4, which shows a constant speed engine, the second arm is provided with a slot to receive cam shaft 41 which extends across the engine compartment and is supported, via bushings 42, by the wall of the engine compartment. Shaft 41 carries gear 40, designated the cam gear, which is also driven by gear 10.

Shaft 41 does not extend linearly in a single plane across the engine compartment but is essentially bi-planar. It may be looked upon as having a set back and characterized as a cam shaft.

The purpose of the cam shaft is to direct impeller 33 and rocker 31 to the precise positions shown in FIG. 5A through 5D, as well as to impart work to the cycle and to permit the rocker to rock as the shaft rotates. A camming effect is obtained from the eccentric design of the shaft. A similar effect could be obtained with an irregularly shaped cam slot rather than with an irregularly shaped shaft.

FIG. 5A through 5D shows the cycle when internal gear 10 travels in counter-clockwise direction. Work is done on the cycle by the rocking motion of rocker element 31 rocking in a direction opposite to the natural and in some cases pulling against the centrifugal force generated by impeller 33 as well as by increasing the speed of the impeller. It should be noted that the path the impeller travels is a sort of modified ellipse with the intent of making the major axis of this ellipse as large as possible, which in turn will have the effect of varying the instant center as much as possible.

It should be noted that the maximum speed of impeller 33 is achieved when rocker 31 travels in a clockwise direction and internal gear 10 travels in a counter-clockwise direction, and minimum speed when rocker 31 travels in the same direction as gear 10.

Figure 2:
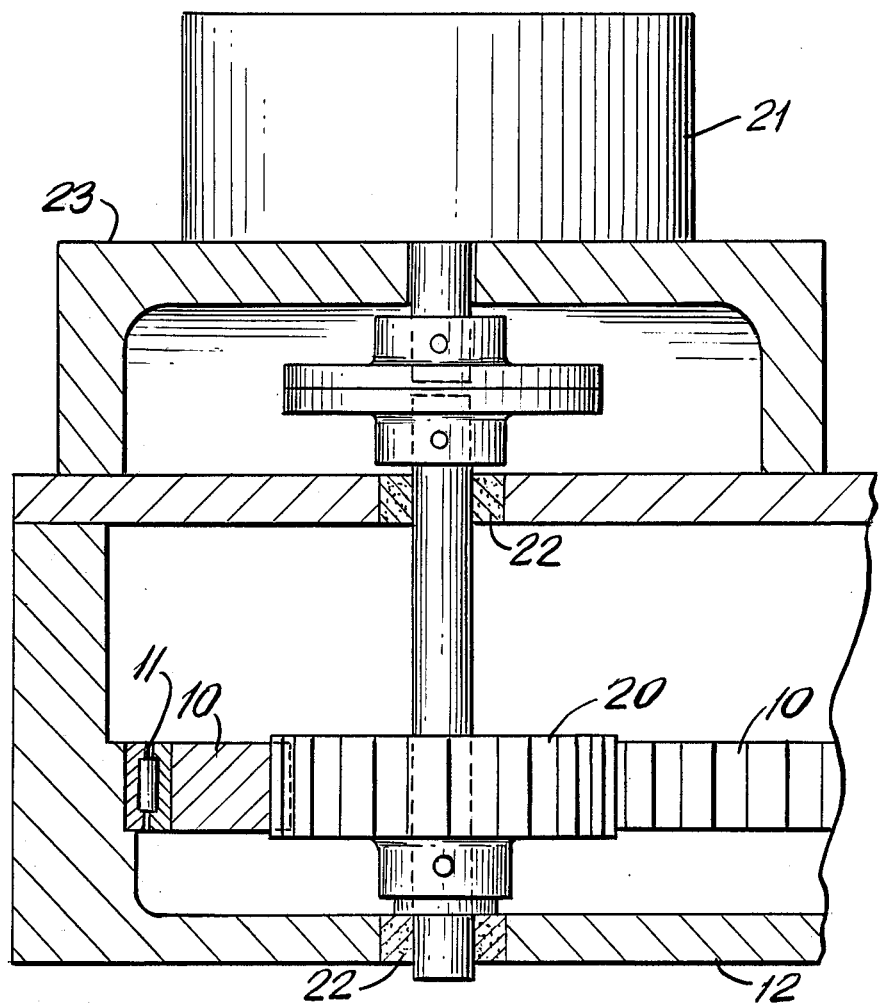
FIG. 2 is a sectional view taken on line 2—2 of FIG. 1.

In operation gear 20 imparts rotary motion to gear 10. Gear 20 is driven by either engine or motor 21 mounted on bracket 23, as shown in FIG. 2. Gear 10 in turn drives gear 30 which turns impeller 33. Controlled variations of the force output of this device may be realized by varying the speed of either the engine or motor.

The rocking motion of the rocker element is caused by the driving cam shaft 41 as it rotates each 360°. When the rocking direction is counter to the rotating direction of gear 10, the speed of impeller 33 increases. When the rocking direction is the same as the rotating direction of gear 10, the speed of impeller 33 decreases.

The net result of the rocking, in addition to changing the speed of the impeller, is to cause the impeller to be driven through a modified elliptical path which results in varying the instant center around which the impeller rotates.

FIG. 6, along with sections shown in FIGS. 7 to 9, is a variation of invention. FIG. 1 shows only the basic cycle. FIG. 6, which depicts a practical variation to FIG. 1, is identical to diagram described in FIG. 1 with two notable exceptions. In FIG. 6 there is a second impeller 38 which can best be described as a mirror image twin of impeller 33. The centrifugal forces generated from each impeller at any time are to be identical. The second variation is the addition of flywheel 43 located on cam shaft 41 and shown in FIG. 9.

FIG. 10 along with sections shown on FIGS. 11 and 12 are still another variation of my invention. FIG. 10 is identical to diagram described in FIG. 6 with one notable exception, namely, internal gear 10 is replaced by external gear 15.

It is to be realized that the embodiment herein described are but a few of many that can utilize the principles of the present invention and it is not intended to limit the invention to these specific embodiments as the invention encompasses all embodiments falling within the scope and spirit of the appended claims.

Having described my invention, I claim:

1. Machine for converting rotational torque into linear force comprising an internally toothed annular gear, driven by a variable speed motor which has capability of reversing its direction of rotation, in operative interconnection with three smaller externally toothed circular gears mounted within its annulus, one in interconnection with a source of rotary motion for driving the annular gear, the remaining two being driven by the annular gear, a rocker member pivotably supported along the axis of the annular gear and rockable on that axis, said rocker member having two spaced arms each in interconnection with one of the respective gears driven by the annular gear, said gears causing the rocker member to move an impeller rotatable with one of the said gears, said impeller generating a centrifugal force, the other gear driven by the annular gear causing the rocker member to rock by means of a cam shaft, the path traced by the said impeller shall be the widest obtainable such that said impeller shall always be on the outside part of the cycle, so that for part of the cycle, the rocker will pull opposite to the centrifugal force generated, during the course of rocking the rotatable impeller will be caused to regularly increase its speed with rocking motion in one direction, and decrease its speed with rocking motion in the opposite direction, this rocking will cause the impeller to vary the center about which it rotates and will have the effect of producing linear force from the original rotational movement, the other said gear having means for limiting the motion of the rocker member in both clockwise and counter-clockwise directions, said gears and rocker member being housed within a supportive and protective casing.

2. A machine for converting rotational torque into linear force as set forth in claim 1 wherein two complete units are used with a common motor, each unit with the said impeller rotating in opposite directions such that the first impeller shall be the mirror image of the second impeller and the horizontal forces generated by the first impeller will cancel the horizontal forces generated by the second impeller.

3. A machine for converting rotational torque into linear force as set forth in claim 1 comprising first and second impellers, each impeller shall rotate in opposite directions such that the first impeller shall be the mirror image of the second impeller and the horizontal force generated by the first impeller will cancel the horizontal force generated by the second impeller.

4. Machine for converting rotational torque into linear force comprising an externally toothed annular gear, driven by a variable speed motor which has capability of reversing its direction of rotation, in operative interconnection with three smaller externally toothed circular gears mounted around its annulus, one in interconnection with a source of rotary motion for driving the annular gear, the remaining two being driven by the annular gear, a rocker member pivotably supported along the axis of the annular gear and rockable on that axis, said rocker member having two spaced arms, each in interconnection with one of the respective gears driven by the annular gear, said gears causing the rocker member to move an impeller rotatable with one of the said gears said impeller generating a centrifugal force, the other gear driven by the annular gear causing the rocker member to rock by means of a cam shaft, the path traced by the said impeller shall be the widest obtainable such that said impeller shall always be on the outside part of the cycle, so that, for part of the cycle, the rocker member will pull opposite to the centrifugal force generated, during the course of rocking the rotatably impeller will be caused to regularly increase its speed with rocking motion in one direction, and decrease its speed with rocking motion in the opposite direction, this rocking will cause the impeller to vary the center about which it rotates which will have the effect of producing linear force from the original rotational movement, the other said gear having means for limiting the motion of the rocker member in both clockwise and counter-clockwise directions, said gears and rocker member being housed within a supportive and protective casing.

5. A machine for converting rotational torque into linear force as set forth in claim 4 wherein two complete units are used with a common motor, each unit with the said impeller rotating in opposite directions such that the first impeller shall be the mirror image of the second impeller and the horizontal forces generated by the first impeller will cancel the horizontal forces generated by the second impeller.

6. A machine for converting rotational torque into linear force as set forth in claim 4 comprising first and second impellers, each impeller shall rotate in opposite directions such that the first impeller shall be the mirror image of the second impeller and the horizontal force generated by the first impeller will cancel the horizontal force generated by the second impeller.

* * * * *